US012148260B2

(12) United States Patent
Kim et al.

(10) Patent No.: US 12,148,260 B2
(45) Date of Patent: Nov. 19, 2024

(54) BILL STORAGE UNIT OF AUTOMATED TELLER MACHINE

(71) Applicant: HYOSUNG TNS INC., Seoul (KR)

(72) Inventors: Tae Gang Kim, Gyeonggi-do (KR); Ji Youn Cho, Seoul (KR); Gun Hyuk Lim, Gyeonggi-do (KR); Chang Ho Lee, Gyeonggi-do (KR); Sang Hyun Lee, Incheon (KR)

(73) Assignee: HYOSUNG TNS INC., Seoul (KR)

( * ) Notice: Subject to any disclaimer, the term of this patent is extended or adjusted under 35 U.S.C. 154(b) by 320 days.

(21) Appl. No.: 17/863,464

(22) Filed: Jul. 13, 2022

(65) Prior Publication Data

US 2023/0069131 A1 Mar. 2, 2023

(30) Foreign Application Priority Data

Aug. 12, 2021 (KR) ........................ 10-2021-0106732

(51) Int. Cl.
*G07D 11/13* (2019.01)
*G07D 11/125* (2019.01)
(Continued)

(52) U.S. Cl.
CPC ........... *G07D 11/13* (2019.01); *G07D 11/125* (2019.01); *G07D 11/40* (2019.01);
(Continued)

(58) Field of Classification Search
CPC .... G07D 11/13; G07D 11/40; G07D 2211/00; G07D 11/125; B65H 2402/60; B65H 2405/1112; H01R 13/631
See application file for complete search history.

(56) References Cited

U.S. PATENT DOCUMENTS 9,027,918 B2 * 5/2015 Komatsu .................. B65H 3/44 271/9.12
2014/0054848 A1 2/2014 Komatsu et al.

FOREIGN PATENT DOCUMENTS

EP 2 346 007 A2 7/2011
JP 2008 198131 A 8/2008
(Continued)

OTHER PUBLICATIONS

Office Action dated Apr. 10, 2023, issued in corresponding Korean application No. 10-2021-0106732.
(Continued)

*Primary Examiner* — Jeremy R Severson
(74) *Attorney, Agent, or Firm* — BACON & THOMAS, PLLC

(57) ABSTRACT

A bill storage unit of an automated teller machine according to an embodiment includes: a lower cassette and an upper cassette which have bills stored therein and are vertically stacked; an external control board disposed outside the lower cassette and the upper cassette to perform power supply and communication signal transmission to the lower cassette and the upper cassette; first and second internal control boards electrically connected to the external control board and disposed inside the lower cassette and the upper cassette to perform power supply and communication signal transmission to each of components inside the lower cassette and components inside the upper cassette; a plurality of connectors interconnected to electrically connect the external control board and the first and second internal control boards; and a position alignment means configured to, when the upper cassette is being stacked on the lower cassette, guide the plurality of connectors to be interconnected at correct positions.

7 Claims, 3 Drawing Sheets

(51) Int. Cl.
*G07D 11/40* (2019.01)
*H01R 13/631* (2006.01)

(52) U.S. Cl.
CPC .. *B65H 2402/60* (2013.01); *B65H 2405/1112* (2013.01); *G07D 2211/00* (2013.01); *H01R 13/631* (2013.01)

(56) References Cited

FOREIGN PATENT DOCUMENTS

| | | | |
|---|---|---|---|
| JP | 2014142845 | A | 8/2014 |
| JP | 2015 197686 | A | 11/2015 |
| JP | 6740776 | B2 | 8/2020 |
| KR | 2021 0027981 | A1 | 3/2021 |

OTHER PUBLICATIONS

Search Report dated Jan. 11, 2023 issued in corresponding European application No. 22 185 250.2.

* cited by examiner

BILL STORAGE UNIT OF AUTOMATED TELLER MACHINE

BACKGROUND

1. Field of the Invention

The present invention relates to a bill storage unit of an automated teller machine, and more particularly, to a bill storage unit of an automated teller machine in which a configuration of a device for power supply and communication signal transmission to vertically stacked cassettes is simplified.

2. Discussion of Related Art

An automated teller machine is an unmanned terminal that is widely used in the financial industry and allows a user to perform deposit and withdrawal of cash or checks, do an account transfer, or check account balance without time restrictions using a cash card or passbook issued by a financial institution so that the user's financial affairs can be promptly processed.

Inside the automated teller machine, a deposit/withdrawal unit for the user to insert or receive bills for deposit or withdrawal, an identification unit configured to identify whether there is an abnormality in the bills deposited or withdrawn through the deposit/withdrawal unit and the types of the bills, a temporary storage unit configured to temporarily store the bills identified as normal bills by the identification unit among the bills deposited through the deposit/withdrawal unit, and a bill storage unit in which a plurality of cassettes for storing bills deposited, withdrawn, or recovered are stored are included.

The plurality of cassettes stored in the bill storage unit may include a recirculation cassette in which bills to be withdrawn are stored simultaneously as deposited bills are stored, a reject cassette to which bills identified as having an abnormality by the identification unit at the time of withdrawal are returned to be stored, and a replenishment/recovery cassette in which bills to be replenished into the recirculation cassette are stored or bills recovered due to insufficient bill storage space in the recirculation cassette are stored.

Conventionally, for the purpose of storing various types of bills, cassettes vertically stacked in a bill storage unit have been adopted, but since components for power supply and communication signal transmission to an upper cassette and a lower cassette are separately provided for each cassette, there are problems that the structure of the device becomes complicated and the components occupy a large volume.

Also, since the conventional bill storage unit has a structure in which the upper cassette and the lower cassette are separated, there is a problem that, when transporting and mounting the cassettes, a worker should separately move each cassette and thus it is inconvenient for the worker.

The related art of the conventional bill storage unit of an automated teller machine has been published in Korean Patent Publication No. 10-2007-0028058.

SUMMARY OF THE INVENTION

The present invention is directed to providing a bill storage unit of an automated teller machine in which a configuration of a device for power supply and communication signal transmission to vertically stacked cassettes is simplified.

The present invention is also directed to providing a bill storage unit of an automated teller machine in which separation and coupling of an upper cassette and a lower cassette are made possible to improve work convenience when moving and mounting the cassettes.

A bill storage unit of an automated teller machine according to the present invention includes: a lower cassette and an upper cassette which have bills stored therein and are vertically stacked; an external control board disposed outside the lower cassette and the upper cassette to perform power supply and communication signal transmission to the lower cassette and the upper cassette; first and second internal control boards electrically connected to the external control board and disposed inside the lower cassette and the upper cassette to perform power supply and communication signal transmission to each of components inside the lower cassette and components inside the upper cassette; a plurality of connectors interconnected to electrically connect the external control board and the first and second internal control boards; and a position alignment means configured to, when the upper cassette is being stacked on the lower cassette, guide the plurality of connectors to be interconnected at correct positions.

The plurality of connectors may include: a first connector electrically connected to the external control board; a second connector detachably connected to the first connector, electrically connected to the first internal control board, and disposed at a lower portion of the lower cassette; a third connector electrically connected to the second connector and disposed at an upper portion of the lower cassette; and a fourth connector detachably connected to the third connector, electrically connected to the second internal control board, and disposed at a lower portion of the upper cassette.

The position alignment means may include a protruding portion which protrudes a predetermined length downward from an edge portion of a lower end of the upper cassette and a seating groove which is formed at an edge portion of an upper end of the lower cassette and has a shape that matches the shape of the protruding portion to allow the protruding portion to be seated thereon.

The bill storage unit may further include: a bill inlet formed at one side portion of an upper end of the upper cassette; a vertical return passage vertically provided to allow bills introduced through the bill inlet to be returned to the upper portion of the lower cassette via the upper cassette; a branched return passage branched to the other side from the vertical return passage disposed at an upper portion of the upper cassette; a gate disposed at a branch point between the vertical return passage and the branched return passage to switch a bill return path; an upper bill accumulation unit disposed at the other side of the upper portion of the upper cassette to accumulate bills, which are returned through the branched return passage, in a bill accumulation space of the upper cassette; and a lower bill accumulation unit disposed at one side of the upper portion of the lower cassette to accumulate bills, which are returned through the vertical return passage, in a bill accumulation space of the lower cassette.

The vertical return passage may include an upper vertical return passage which is connected from the bill inlet to the lower end of the upper cassette and a lower vertical return passage which is connected from the upper end of the lower cassette to the lower bill accumulation unit and has an upper end configured to be separable from and connectable to a lower end of the upper vertical return passage.

A locking device which is locked so that the upper cassette and the lower cassette are coupled to each other or unlocked so that the upper cassette and the lower cassette are separated from each other may be disposed at a connection portion where the lower end of the upper cassette and the upper end of the lower cassette are connected.

The locking device may be operated to be locked during transportation of the upper cassette and the lower cassette and unlocked during storage of the upper cassette and the lower cassette in the automated teller machine.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, configurations and actions relating to exemplary embodiments of the present invention will be described in detail with reference to the accompanying drawings.

Figure 1:
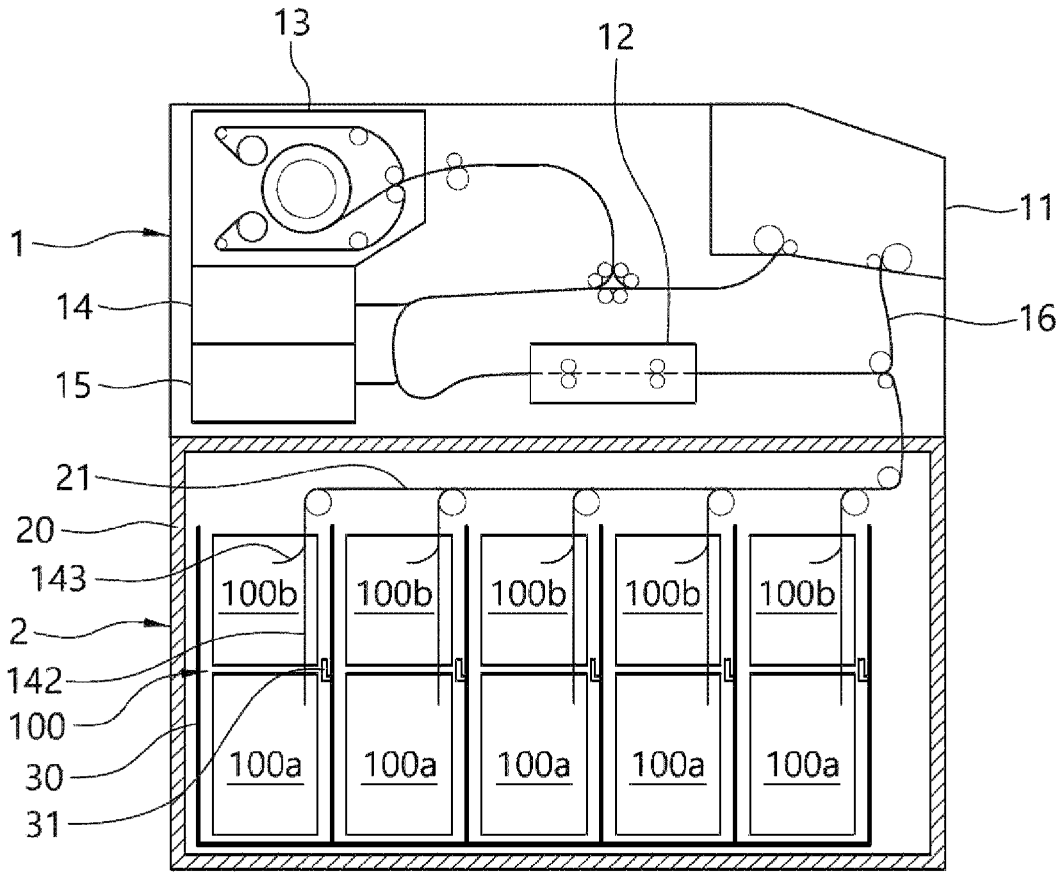
FIG. 1 is a view schematically illustrating an automated teller machine according to one embodiment to which the present invention is applied.

FIG. 1 is a view schematically illustrating an automated teller machine according to one embodiment to which the present invention is applied. The automated teller machine according to one embodiment to which the present invention is applied includes an upper unit 1 and a lower unit 2 disposed therebelow.

The upper unit 1 may include a deposit/withdrawal unit 11 where insertion and receipt of bills are performed during deposit and withdrawal, an identification unit 12 configured to identify whether there is an abnormality in the bills and the types of the bills, a temporary storage unit 13 configured to temporarily store the bills identified as normal bills among the bills that have passed through the identification unit 12, a counterfeit bill storage unit 14 and a non-received bill storage unit 15 which are provided as a stacked structure below the temporary storage unit 13, and a return passage 16 along which bills are returned.

In the lower unit 2, a bill storage unit 100 including a plurality of cassettes configured to store deposited bills and discharge bills stored therein when there is a request for withdrawal may be provided, and a safe 20 for theft prevention may be installed around the bill storage unit 100.

As the cassettes disposed in the bill storage unit 100 inside the safe 20, a plurality of lower cassettes 100*a* and a plurality of upper cassettes 100*b* which are disposed in vertically stacked structures may be disposed so that pairs of the lower cassette 100*a* and the upper cassette 100*b* are horizontally spaced apart from each other. The lower cassettes 100*a* and the upper cassettes 100*b* constituting the bill storage unit 100 may store different bills in consideration of the frequency of use and the type of bills.

Also, a cassette mounting unit 30 in which the lower cassettes 100*a* and the upper cassettes 100*b* are stored and mounted is disposed inside the safe 20, and a catching member (hook) 31 for unlocking of a locking device 190 (191 and 192), which will be described below, at the time of mounting the lower cassettes 100*a* and the upper cassettes 100*b* inside the cassette mounting unit 30 is disposed at an inner side surface of the cassette mounting unit 30.

Figure 2:
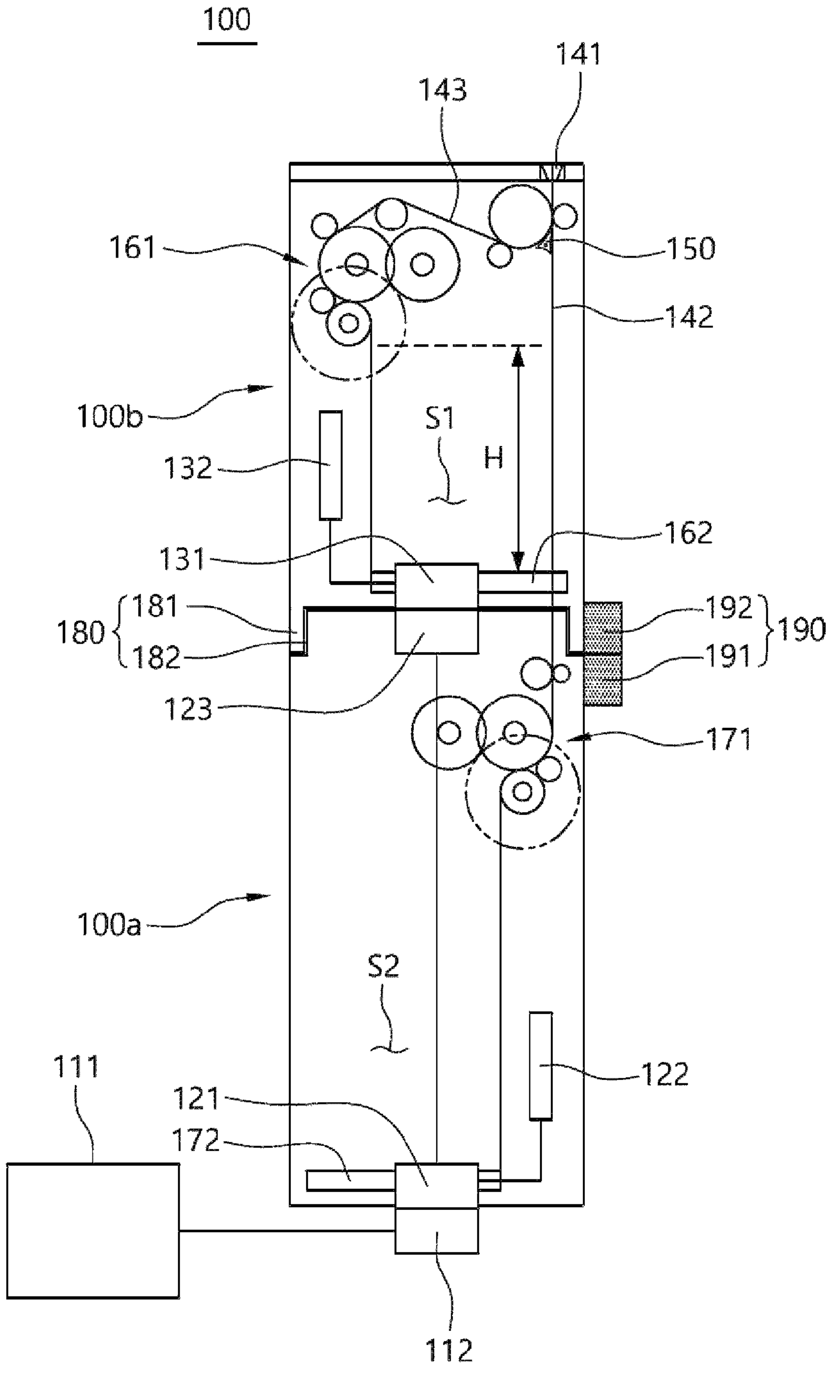
FIG. 2 is a view illustrating a state in which a bill storage unit of an automated teller machine according to the present invention is coupled.
Figure 3:
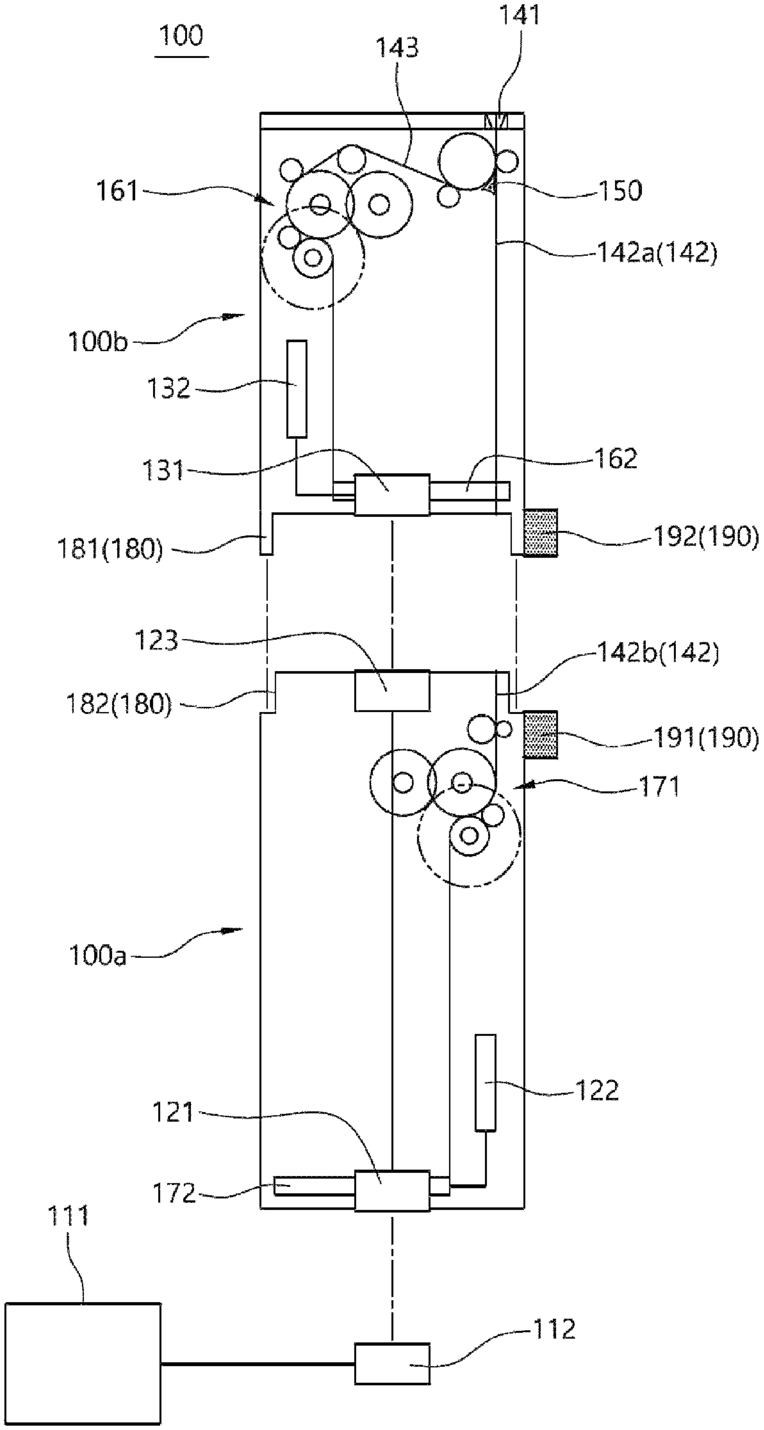
FIG. 3 is a view illustrating a state in which the bill storage unit of an automated teller machine according to the present invention is separated.

FIG. 2 is a view illustrating a state in which a bill storage unit of an automated teller machine according to the present invention is coupled, and FIG. 3 is a view illustrating a state in which the bill storage unit of an automated teller machine according to the present invention is separated.

A bill storage unit 100 of an automated teller machine according to the present invention includes a lower cassette 100*a* and an upper cassette 100*b* which have bills stored therein and are vertically stacked, and the upper cassette 100*b* is stacked on the lower cassette 100*a*.

Outside the lower cassette 100*a* and the upper cassette 100*b*, an external control board 111 for power supply and communication signal transmission to the lower cassette 100*a* and the upper cassette 100*b* is disposed. The external control board 111 is electrically connected to a power supply source (not illustrated) and serves to receive and transmit a wired or wireless communication signal.

A first internal control board 122 which is electrically connected to the external control board 111 and performs power supply and communication signal transmission to components inside the lower cassette 100*a* is disposed inside the lower cassette 100*a*.

A second internal control board 132 which is electrically connected to the external control board 111 and performs power supply and communication signal transmission to components inside the upper cassette 100*b* is disposed inside the upper cassette 100*b*.

The components inside the lower cassette 100*a* and the upper cassette 100*b* may include mechanical components and electric/electronic, communication, and control components necessary for returning bills to the bill storage unit 100 and storing the bills therein.

The external control board 111 and the first and second internal control boards 122 and 132 may be electrically connected by a plurality of connectors 112, 121, 123, and 131.

In this way, by using a single external control board 111 in common to supply power to the lower cassette 100*a* and the upper cassette 100*b* and transmit a communication signal thereto, a configuration of a device for power supply and communication signal transmission to the lower cassette 100*a* and the upper cassette 100*b* which are vertically stacked can be simplified.

The plurality of connectors 112, 121, 123, and 131 may include a first connector 112 electrically connected to the external control board 111, a second connector 121 detachably connected to the first connector 112, electrically connected to the first internal control board 122, and disposed at a lower portion of the lower cassette 100*a*, a third connector 123 electrically connected to the second connector 121 and disposed at an upper portion of the lower cassette 100*a*, and a fourth connector 131 detachably connected to the third connector 123, electrically connected to the second internal control board 132, and disposed at a lower portion of the upper cassette 100*b*.

When the upper cassette 100*b* is being stacked on the lower cassette 100*a*, the plurality of connectors 112, 121, 123, and 131 should be connected to each other at correct positions. That is, there is a problem that while the first connector 112 and the second connector 121 can be easily connected to each other by a worker through a space exposed to the outside of the lower cassette 100*a*, the third connector 123 disposed at an upper end of the lower cassette 100*a* and the fourth connector 131 disposed at a lower end of the upper cassette 100*b* are disposed at positions not exposed to the outside and thus are not easy to be interconnected at correct positions at the time of mounting the upper cassette 100*b* on the lower cassette 100*a*.

As a configuration for addressing the above problem, the bill storage unit 100 according to the present invention includes a position alignment means 180 (181 and 182) configured to, when the upper cassette 100*b* is being stacked on the lower cassette 100*a*, guide the plurality of connectors 112, 121, 123, and 131 to be interconnected at correct positions.

In one embodiment, the position alignment means 180 (181 and 182) may include a protruding portion 181 which protrudes a predetermined length downward from an edge portion of the lower end of the upper cassette 100*b* and a seating groove 182 which is formed at an edge portion of the upper end of the lower cassette 100*a* and has a shape that matches the shape of the protruding portion 181 to allow the protruding portion 181 to be seated thereon.

By the above configuration of the position alignment means 180 (181 and 182), when the upper cassette 100*b* is stacked on the lower cassette 100*a* so that the shape of the protruding portion 181 matches the shape of the seating groove 182, the third connector 123 and the fourth connector 131 can be automatically interconnected at correct positions.

Also, by the protruding portion 181 being formed to protrude downward from the edge portion of the lower end of the upper cassette 100*b*, during separation of the upper cassette 100*b* from the lower cassette 100*a*, even when the upper cassette 100*b* comes into contact with the ground, only the protruding portion 181 comes into contact with the ground and the fourth connector 131 does not come in direct contact with the ground due to being disposed above a space surrounded by the protruding portion 181, and thus damage to the fourth connector 131 that may be caused when the fourth connector 131 comes into contact with the ground can be prevented.

Meanwhile, a bill inlet 141 is formed at one side portion of an upper end of the upper cassette 100*b*, and a vertical return passage 142 which is vertically provided to allow bills introduced through the bill inlet 141 to be returned to the upper portion of the lower cassette 100*a* via the upper cassette 100*b* and a branched return passage 143 branched to the other side from the vertical return passage 142 disposed at an upper portion of the upper cassette 100*b* are disposed.

A gate 150 configured to rotate within a predetermined angle range in both directions to switch a bill return path is disposed at a branch point between the vertical return passage 142 and the branched return passage 143.

An upper bill accumulation unit 161 configured to accumulate bills, which are returned through the branched return passage 143, in a bill accumulation space S1 of the upper cassette 100*b* is disposed at the other side (left side in the drawings) of the upper portion of the upper cassette 100*b*.

A lower bill accumulation unit 171 configured to accumulate bills, which are returned through the vertical return passage 142, in a bill accumulation space S2 of the lower cassette 100*a* is disposed at one side (right side in the drawings) of the upper portion of the lower cassette 100*a*.

The upper bill accumulation unit 161 and the lower bill accumulation unit 171 may be configured to include a plurality of rollers which are disposed at positions opposite to each other and rotate while holding bills and a sheet roller which includes a plurality of elastic sheets at an outer peripheral surface to hit a rear end portion of each bill toward the bill accumulation spaces S1 and S2.

In this way, by the upper bill accumulation unit 161 being configured to be disposed at the other side (left side in the drawings) of the upper portion of the upper cassette 100*b*, as compared to a case in which the upper bill accumulation unit 161 is configured to be disposed at one side (right side in the drawings) of the upper portion of the upper cassette 100*b*, a height H of the bill accumulation space S1 inside the upper cassette 100*b* can be formed to be higher. Therefore, there are advantages in that a bill accumulation capacity can be increased and a sufficient space can be secured for a bill return path which connects the bill inlet 141, the gate 150, the branched return passage 143, and the upper bill accumulation unit 161, thus reducing an occurrence of jamming of bills.

Referring to FIG. 3, the vertical return passage 142 may include an upper vertical return passage 142*a* which is connected from the bill inlet 141 to the lower end of the upper cassette 100*b* and a lower vertical return passage 142*b* which is connected from the upper end of the lower cassette 100*a* to the lower bill accumulation unit 171 and has an upper end configured to be separable from and connectable to a lower end of the upper vertical return passage 142*a*.

Meanwhile, the locking device 190 (191 and 192) configured to be locked so that the upper cassette 100*b* and the lower cassette 100*a* are coupled to each other or unlocked so that the upper cassette 100*b* and the lower cassette 100*a* are separated from each other may be disposed at a connection portion where the lower end of the upper cassette 100*b* and the upper end of the lower cassette 100*a* are connected.

In one embodiment, the locking device 190 (191 and 192) may include a lower locking unit 191 which is disposed at the upper end of the lower cassette 100*a* and an upper locking unit 192 which is disposed at the lower end of the upper cassette 100*b* and able to be locked to or unlocked from the lower locking unit 191.

The locking device 190 (191 and 192) may be operated to be locked during transportation of the upper cassette 100*b* and the lower cassette 100*a* and unlocked during storage of the upper cassette 100*b* and the lower cassette 100*a* in the automated teller machine.

In this way, by the locking device 190 (191 and 192) being operated to be locked to prevent the upper cassette 100*b* and the lower cassette 100*a*, which are coupled to each other, from being separated in order to protect the connectors and ensure convenience of loading during transportation of the upper cassette 100*b* and the lower cassette 100*a* and by the locking device 190 (191 and 192) being operated to be unlocked during storage of the upper cassette 100*b* and the lower cassette 100*a* in the automated teller machine, the upper cassette 100*b* and the lower cassette 100*a* can be detached one by one from the lower unit 2, and thus work convenience can be improved.

In this case, when mounting the upper cassette 100*b* and the lower cassette 100*a* on the cassette mounting unit 30 (see FIG. 1) of the lower unit 2 in a state in which the locking device 190 (191 and 192) is locked, the locking device 190 (191 and 192) may be configured to be unlocked by the catching member (hook) 31 disposed at the cassette mounting unit 30.

By a bill storage unit of an automated teller machine according to the present invention, a configuration of a device for power supply and communication signal transmission to an upper cassette and a lower cassette which are vertically stacked can be simplified.

Also, when the upper cassette is being stacked on the lower cassette, connectors can be interconnected at accurate positions by a position alignment means.

Also, by forming a protruding portion that protrudes downward from an edge portion of a lower end of the upper cassette, during separation of the cassettes, the connectors do not come into contact with the ground even when the upper cassette comes into contact with the ground, and thus damage to the connectors can be prevented.

Also, an upper bill accumulation unit disposed at the upper cassette is configured to be disposed at the opposite side of a side where a bill inlet and a gate are disposed. In this way, a bill accumulation capacity of the upper cassette can be increased, and an occurrence of jamming of bills can be reduced.

In addition, during transportation of the cassettes, a locking device is operated to be locked so that, for protection of the connectors and convenience of loading, the upper cassette and the lower cassette which are coupled to each other are not separated, and during storage of the cassettes in the automated teller machine, the locking device is unlocked so that the upper cassette and the lower cassette are able to be detached one by one. In this way, work convenience can be improved.

As described above, the present invention is not limited to the embodiments described above, and modifications can be made by those of ordinary skill in the art to which the invention pertains without departing from the technical spirit of the present invention claimed in the attached claims, and such modifications also fall within the scope of the present invention.

[Description of reference numerals]

| | |
|---|---|
| 1: upper unit | 2: lower unit |
| 11: deposit/withdrawal unit | 12: identification unit |
| 13: temporary storage unit | 14: counterfeit bill storage unit |
| 15: non-received bill storage unit | 16: return passage |
| 20: safe | 21: horizontal return passage |
| 30: cassette mounting unit | 31: catching member (hook) |
| 100: bill storage unit | 100a: lower cassette |
| 100b: upper cassette | 111: external control board |
| 112: first connector | 121: second connector |
| 122: first internal control board | 123: third connector |
| 131: fourth connector | 132: second internal control board |
| 141: bill inlet | 142: vertical return passage |
| 142a: upper vertical return passage | 142b: lower vertical return passage |
| 150: gate | 161: upper bill accumulation unit |
| 162: upper push plate | 171: lower bill accumulation unit |
| 172: lower push plate | 180: position alignment means |
| 181: protruding portion | 182: seating groove |
| 190: locking device | 191: lower locking unit |
| 192: upper locking unit | S1, S2: bill accumulation space |
| H: height of bill accumulation space | |

What is claimed is:

1. A bill storage unit of an automated teller machine, the bill storage unit comprising:

a lower cassette and an upper cassette which have bills stored therein and are vertically stacked;

an external control board disposed outside the lower cassette and the upper cassette to perform power supply and communication signal transmission to the lower cassette and the upper cassette;

first and second internal control boards electrically connected to the external control board and disposed inside the lower cassette and the upper cassette to perform power supply and communication signal transmission to each of components inside the lower cassette and components inside the upper cassette;

a plurality of connectors interconnected to electrically connect the external control board and the first and second internal control boards; and a position alignment means configured to, when the upper cassette is being stacked on the lower cassette, guide the plurality of connectors to be interconnected at correct positions.

2. The bill storage unit of claim 1, wherein the plurality of connectors include:

a first connector electrically connected to the external control board;

a second connector detachably connected to the first connector, electrically connected to the first internal control board, and disposed at a lower portion of the lower cassette;

a third connector electrically connected to the second connector and disposed at an upper portion of the lower cassette; and a fourth connector detachably connected to the third connector, electrically connected to the second internal control board, and disposed at a lower portion of the upper cassette.

3. The bill storage unit of claim 1, wherein the position alignment means includes a protruding portion which protrudes a predetermined length downward from an edge portion of a lower end of the upper cassette and a seating groove which is formed at an edge portion of an upper end of the lower cassette and has a shape that matches the shape of the protruding portion to allow the protruding portion to be seated thereon.

4. The bill storage unit of claim 1, further comprising:

a bill inlet formed at one side portion of an upper end of the upper cassette;

a vertical return passage vertically provided to allow bills introduced through the bill inlet to be returned to the upper portion of the lower cassette via the upper cassette;

a branched return passage branched to the other side from the vertical return passage disposed at an upper portion of the upper cassette;

a gate disposed at a branch point between the vertical return passage and the branched return passage to switch a bill return path;

an upper bill accumulation unit disposed at the other side of the upper portion of the upper cassette to accumulate bills, which are returned through the branched return passage, in a bill accumulation space of the upper cassette; and a lower bill accumulation unit disposed at one side of the upper portion of the lower cassette to accumulate bills, which are returned through the vertical return passage, in a bill accumulation space of the lower cassette.

5. The bill storage unit of claim 4, wherein the vertical return passage includes an upper vertical return passage which is connected from the bill inlet to the lower end of the upper cassette and a lower vertical return passage which is connected from the upper end of the lower cassette to the lower bill accumulation unit and has an upper end configured to be separable from and connectable to a lower end of the upper vertical return passage.

6. The bill storage unit of claim 1, wherein a locking device which is locked so that the upper cassette and the lower cassette are coupled to each other or unlocked so that the upper cassette and the lower cassette are separated from each other is disposed at a connection portion where the lower end of the upper cassette and the upper end of the lower cassette are connected.

7. The bill storage unit of claim 6, wherein the locking device is operated to be locked during transportation of the upper cassette and the lower cassette and unlocked during storage of the upper cassette and the lower cassette in the automated teller machine.

* * * * *